S. O. HAHN.
SINGLE TUBE TIRE.
APPLICATION FILED OCT. 12, 1920.
1,406,555.
Patented Feb. 14, 1922.
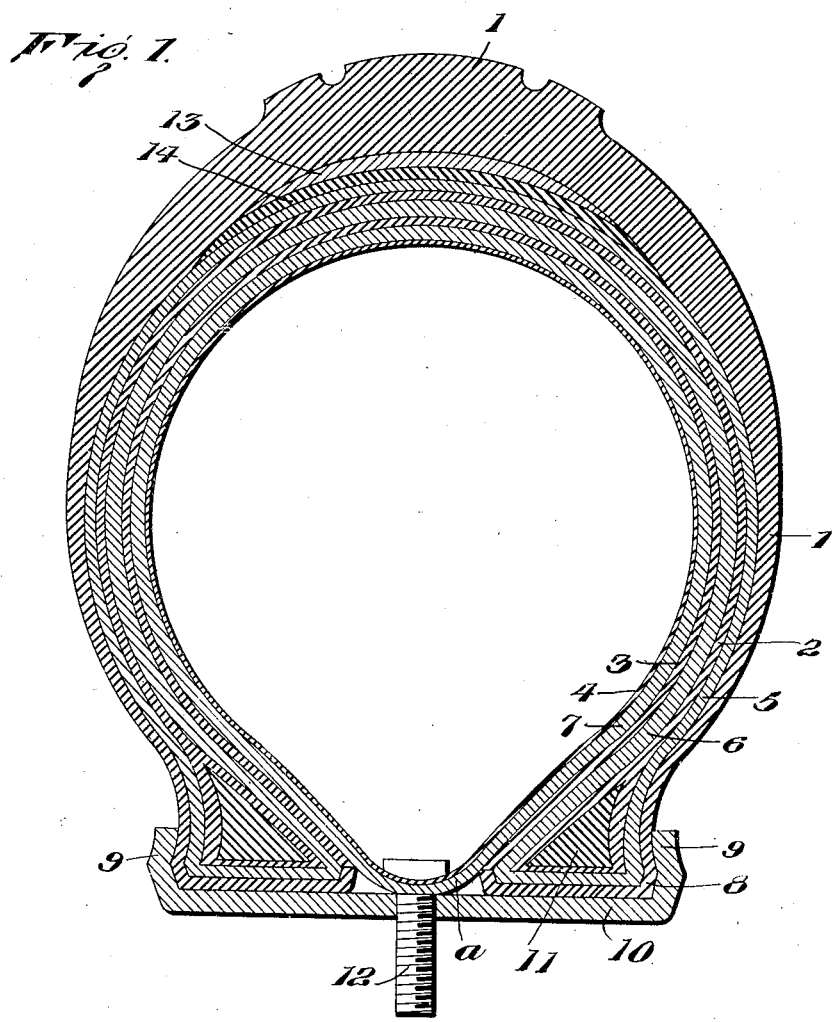
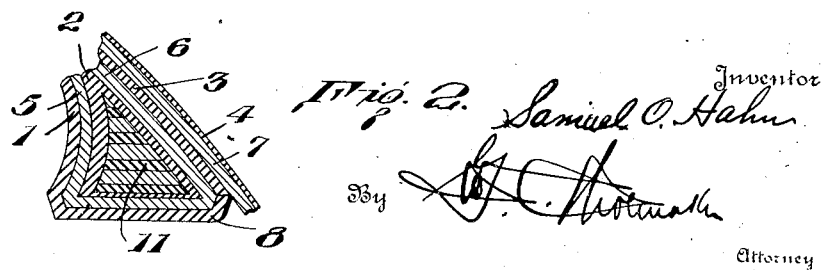

UNITED STATES PATENT OFFICE.

SAMUEL OTIS HAHN, OF PUEBLO, COLORADO.

SINGLE-TUBE TIRE.

1,406,555.  Specification of Letters Patent.  Patented Feb. 14, 1922.

Application filed October 12, 1920. Serial No. 416,364.

*To all whom it may concern:*

Be it known that I, SAMUEL OTIS HAHN, a citizen of the United States of America, and a resident of Pueblo, Colorado, have invented certain new and useful Improvements in Single-Tube Tires, of which the following is a specification.

This invention relates to a pneumatic puncture proof tire.

One object of the invention is to improve the construction of pneumatic tires and to provide a simple practical and efficient puncture proof tire designed for use on automobiles, trucks and various other motor vehicles and composed of a plurality of layers of rubber and leather interbonded by means of a rubber cement, the rubber constituent of which becomes incorporated in the body of the leather to effect an integral mass incapable of stripping, thus forming the body or carcass of the tire, capable of affording the desired strength and puncture resistance without the employment of a cord or woven fabric body or similar reinforcing means, and of also increasing the durability and life of the tire.

A further object of the invention is to provide in a pneumatic tire a combined casing and tube provided with rim engaging beads and having a layer of leather extending entirely around the inner portion of the tire and forming an interior air chamber of the capacity or function of an ordinary pneumatic inner tube and adapted to be inflated in a similar manner.

A still further object resides in the provision of a combined casing and pneumatic tube provided with reinforced attaching beads having reinforcements with expansiveness comparatively uniform with relation to the expansiveness of the tire so that under the action of heat of the tire incident to friction, materially unequal strains and stresses and undue wear between the reinforcements and the beads are obviated.

It is still further designed to provide a combined casing and pneumatic tube having attaching beads and an inner portion bridging the beads and flexible for expansion under the influence of the air when the tire is inflated to force the beads into tight engagement with the rim flanges, and also adapted to engage the rim between the beads and flanges, whereby the said bridging portion or inner tube and the beads take the entire load.

With the above and other objects in view, the invention consists in the novel construction, combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:

Figure 1 is a transverse sectional view of a combined casing and pneumatic tube constructed in accordance with the present invention, the same being shown inflated.

Figure 2 is a detail cross sectional view illustrating a modified form of tire bead reinforcement.

Referring now more particularly to the accompanying drawings, the combined casing and pneumatic tube is composed preferably of alternating layers of rubber and leather permanently united and interbonded together in a manner hereinafter explained, and in which the characters 1, 2, 3 and 4 indicate layers of rubber, interposed between which are layers of chrome leather 5, 6 and 7, the layers of leather and rubber being firmly united by means of a rubber cement to provide an integral mass with the rubber constituent of the cement penetrating and becoming embedded within and interbonded with the body of the leather so that it will be impossible to strip the rubber from the leather.

The combined casing and pneumatic tube is provided with beads 8 of substantially triangular or of such other form and configuration in cross section as to effectually engage the flanges 9 of a rim 10 of clincher or other type. It has been the practice in the art to reinforce the beads of pneumatic tires with wire, cord and other reinforcing elements having expansive qualities varied materially with relation to the expansive qualities of the tires. In other words, the metal reinforcing elements expanding unequally with relation to the rubber, and having a fixed connection thereto, and a fixed relation with the tire, produce unequal strains between the beads and the reinforcing elements, and cause the rubber to be stripped from the reinforcing elements, either through excessive expansion of the reinforcing elements or a relative greater expansion of the beads. The production of these unequal stresses and strains, and the consequent stripping of the rubber from the reinforcing elements of the beads, will occur whether the coefficient of expansion of the reinforcing elements is greater or less than that of the beads and the tire, and can only be eliminated, as in the tire of the present invention, where the coefficient of expansion of the material of the beads is comparatively uniform with that of the reinforcing elements thereof and also with the tire. This uniformity of the coefficient of expansion of the various parts of the tire prevents the rupture and tearing of the parts caused by unequal expansion and contraction, and the life of the tire is thereby materially increased.

It is, therefore, one of the essential characteristics of the present invention to obviate this injurious defect and to dispense with the use of wire, cords and other elements having yieldability or expansiveness materially greater or less than the normal expansiveness of the tire, and to this end, the present beads are preferably built up by internal cores 11 of a shape triangular in cross section, or otherwise, as may be required, and composed of rubber. These cores are surrounded by a continuation of the two layers of leather 5 and 6, the leather layers adjacent the beads conforming in configuration to the cross sectional shape of the cores. As in the body of the tire, the leather layers of the beads are interbonded and interposed between the layers of rubber, the outer or enveloping layer of rubber being in the nature of a coating or a continuation of the outermost rubber layer 1, as clearly shown in the drawings. The cores of the beads may be reinforced by sheets or strips of leather united to the rubber beads after the fashion of the process herein described.

The combined casing and tube has its innermost layer of leather 5 with its rubber coating or lining 4, extending transversely entirely around the tire and at *a* bridging the intervening space between the beads 8, thereby forming the pneumatic inner tube, its bridging part *a* being flexible and in which an ordinary air valve 12 is built.

When the tire is mounted on the rim of the wheel, the pressure within the tube causes the flexible part *a* to exert pressure outwardly against the inner walls of the beads to force the latter outwardly tightly against the inner faces of the flanges 9 of the rim 10, insuring against accidental displacement of the tire with relation to the rim. The internal pressure also forces the part *a* of the tube into engagement with the rim between the flanges whereby to cause the tube and casing beads to take the entire weight of the load. The present pneumatic tube can be inflated to full capacity when the tire is off the rim and has sufficient strength in and of itself to retain the air and therefore, is a very substantial supporter of the load when mounted and inflated and not subject to giving way as a result of "pinching," punctures or blowouts as is the case with the ordinary rubber inner tube; which, as is well known, cannot be fully inflated when demounted. Moreover, when a tire containing the ordinary rubber tube is mounted and fully inflated, it must have a uniformly smooth and continuous surface of sufficient strength to take the entire load both of the air pressure within it and also the entire weight of the car and its load and the tube cannot for long bridge over a hole in the casing no matter how small the hole or puncture, while in the present invention, the inner tube will bridge over almost any hole or crack in the shoe or casing, due to usual puncturing accidents.

A leather or other suitable breaker strip 13, together with a cushioning layer of rubber 14, may be interposed between the tread surface 1' of the outer layer of rubber 1 and the outermost layer of leather 5.

As premised in the foregoing, the leather and rubber layers are united firmly together by a suitable process and this process may consist in applying to the surface of chrome leather, vulcanizing cement of a low sulphur content, preferably materially lower in the amount of sulphur content than that of the ordinary commercial rubber cement and in any event sufficiently low to prevent the formation of scale on the surface of the leather. The body of leather is impregnated from each face beyond the surface with a rubber constituent of the cement so that when the rubber and leather layers are vulcanized they will be united into an integral mass and the rubber layers effectually prevented from slipping or being stripped from the leather. This may be effected by coating the surface of the leather with the rubber cement and causing the rubber constituent of the cement to become embedded in the body of the leather by forcing the same into the leather beyond the surface thereof. The application of the cement may be and is preferably effected by means of penetrating brushes, cylinders, rollers or through the instrumentality of any other means adapted to force the cement with the rubber constituent thereof into the body of the leather, not merely on the surface thereof, but beyond the surface of the leather, so as to thoroughly impregnate the latter with the cement.

After treating the chrome leather in the manner hereinbefore stated, the leather saturated and impregnated with the cement is preferably permitted to stand for a period of one-half an hour, more or less, at normal temperature, to permit the cement to set, that is to say, to permit the volatile filler to evaporate and leave the adhesive content of the cement on the leather and also within the body of the leather.

The leather may be treated in the manner described several times, the interval between each application and treatment of the cement being approximately half an hour. Whether one or more applications of the cement are to be had upon the leather, the leather, after the application of the cement, and it has been determined that the leather is in condition to be vulcanized to the rubber, the rubber and leather layers are firmly united and interbonded by vulcanizing with dry heat under pressure as in the ordinary manner of molding and vulcanizing, the dry heat being essential to the production of the integral character of the union of the rubber and leather.

What is claimed is:—

1. A pneumatic tire including an outer casing composed of layers of rubber and leather firmly united together against separation and provided with rim engaging beads and also including a pneumatic inner tube of leather firmly united to the inner layer of rubber carried by the casing whereby to cushion the inner tube, the latter extending transversely entirely around the interior of the casing and bridging the space between the beads, a rubber lining for the leather inner tube, and an inflating valve carried by the tube.

2. A pneumatic tire including a casing composed of interbonded layers of leather and rubber and provided with beads for engaging the rim of a wheel, and a tubular layer of leather extending entirely around the tire and constituting an inner pneumatic tube and interbonded by means of rubber cement with a rubber layer of the casing, the inner tube having a rubber lining interbonded therewith and extending across the space between the beads to form a flexible connecting portion thereat.

3. A pneumatic tire including a laminated casing provided with beads for engaging the rim of a wheel and a tubular layer of leather treated with rubber cement and constituting an inner pneumatic tube and extending entirely around the casing and interbonded with the casing by means of a rubber cement, the latter having portions of its rubber constituent penetrating the body of the leather beyond the surface thereof, whereby to form an integral mass of the leather and rubber, the leather extending across the space between the beads to form a flexible connecting portion thereat, and a valve mounted in the connecting portion of the pneumatic tube at the space between the beads.

4. A pneumatic tire including a casing composed of a plurality of spaced layers of rubber having interposed layers of leather, the inner leather layer being provided with a rubber lining and constituting an inner pneumatic tube, the leather and the rubber being united into an integral mass by means of a rubber cement having portions of its ingredients penetrating the leather layers beyond the surface thereof.

5. A pneumatic tire including a casing composed of layers of leather and rubber interbonded together, the innermost layer being rubber, said casing being provided at opposite sides of its base with rim engaging beads, and an inner pneumatic tube of leather interbonded with the said innermost layer of rubber of the casing and with the inner walls of the beads and extending transversely entirely around the casing and bridging the space between the beads.

6. A pneumatic tire including a casing composed of layers of leather and rubber interbonded together, the innermost layer being rubber, said casing being provided at opposite sides of its base with rim engaging beads, and an inner pneumatic tube of leather interbonded with the said innermost layer of rubber of the casing and with the inner walls the beads and extending transversely entirely around the casing and bridging the space between the beads, the bridging portion of the inner pneumatic tube being flexible and provided with a coating of rubber.

7. A pneumatic tire including a casing provided at opposite sides of its base with rim engaging beads, the latter being provided with reinforcing elements, an inner layer of leather extending transversely entirely around the inner wall of the casing and bridging the space between the beads and constituting an inner pneumatic tube, and a layer of rubber interposed between the casing and the tube, the casing, the tube, and the said layer of rubber being interbonded together, the layer of rubber forming a cushion of the tube.

8. A pneumatic tire including an outer casing composed of layers of rubber and leather firmly united together and provided with rim engaging beads, an inner pneumatic tube including a layer of leather extending entirely around the inner wall of the casing and adhering immovably thereto and extending across the space between the beads of the casing, and adapted to receive and contain the inflating fluid, and a breaker strip embedded immovably in the casing adjacent the tread surface of the latter.

9. A pneumatic tire including a casing composed of layers of leather and rubber interbonded together, the innermost layer being rubber, the casing being provided at opposite sides of its base with rim engaging beads, the latter being provided with reinforcing elements, and an inner tube of leather interbonded with the said innermost layer of rubber of the casing and extending transversely entirely around the casing and bridging the space between the beads, said inner tube having a coating of rubber, the casing, tube, beads and reinforcing elements having substantially uniform coefficients of expansion, whereby unequal strains and stresses and consequent separation and rupture of the materials are prevented.

In testimony whereof I affix my signature.

SAMUEL OTIS HAHN.